(12) United States Patent
Jung et al.

(10) Patent No.: US 11,941,923 B2
(45) Date of Patent: Mar. 26, 2024

(54) AUTOMATION METHOD OF AI-BASED DIAGNOSTIC TECHNOLOGY FOR EQUIPMENT APPLICATION

(71) Applicants: HYUNDAI MOTOR COMPANY, Seoul (KR); KIA CORPORATION, Seoul (KR)

(72) Inventors: In-Soo Jung, Goyang-si (KR); Seung-Hyun Lee, Suwon-si (KR); Jae-Min Jin, Seoul (KR); Dong-Chul Lee, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 405 days.

(21) Appl. No.: 17/508,255

(22) Filed: Oct. 22, 2021

(65) Prior Publication Data
US 2022/0366734 A1 Nov. 17, 2022

(30) Foreign Application Priority Data
May 17, 2021 (KR) .......................... 10-2021-0063610

(51) Int. Cl.
*G07C 5/08* (2006.01)
*G06N 3/042* (2023.01)
*H04L 12/40* (2006.01)

(52) U.S. Cl.
CPC ........... *G07C 5/0808* (2013.01); *G06N 3/042* (2023.01); *H04L 12/40* (2013.01); *H04L 2012/40215* (2013.01); *H04L 2012/40273* (2013.01)

(58) Field of Classification Search
CPC ...... G06N 20/10; G06N 3/042; G06N 3/0464; G06N 3/0985; G07C 5/0808; H04L 12/40; H04L 2012/40215; H04L 2012/40273
See application file for complete search history.

(56) References Cited

U.S. PATENT DOCUMENTS 9,171,259 B1 * 10/2015 Laxmanan ............. G06N 5/022
10,223,842 B1 * 3/2019 Lee ......................... G01H 3/00
(Continued)

FOREIGN PATENT DOCUMENTS

EP 3667447 A1 * 6/2020 ............... G01H 1/00
EP 3751469 A1 * 12/2020 ......... G06F 18/2415
(Continued)

*Primary Examiner* — Babar Sarwar
(74) *Attorney, Agent, or Firm* — Morgan, Lewis & Bockius LLP

(57) ABSTRACT

An automation method of an artificial intelligence (AI)-based diagnostic technology for equipment application includes receiving one or more pieces of data among vibration data, noise data, and controller area network (CAN) data, a data input processing operation of trimming the input data, an operation of extracting features from the trimmed data, setting a setting value of a hyper-parameter with respect to the one or more pieces of data thereamong, and generating a total of N models to include both of machine learning (ML) and deep learning (DL) as N individual models and generating ensemble prediction model structures for the N individual models. As a parameter updating is being proceeded due to the hyper-parameter so as to minimize values of cost functions of the N individual models, a reward for model accuracy performance is optimized and the ensemble prediction model structures of the N individual models change.

11 Claims, 6 Drawing Sheets

(56) References Cited

U.S. PATENT DOCUMENTS

| | | | |
|---|---|---|---|
| 10,943,486 B2* | 3/2021 | Lee | G10L 25/51 |
| 11,521,435 B2* | 12/2022 | Jung | G07C 5/06 |
| 11,748,638 B2* | 9/2023 | Bigaj | G06N 20/00 |
| | | | 706/12 |
| 2007/0179746 A1* | 8/2007 | Jiang | G06F 11/008 |
| | | | 702/185 |
| 2016/0350671 A1* | 12/2016 | Morris, II | G05B 23/0229 |
| 2019/0073591 A1* | 3/2019 | Andoni | G06N 3/126 |
| 2019/0272623 A1* | 9/2019 | Mack | G03F 1/36 |
| 2020/0175877 A1* | 6/2020 | Lee | H04R 3/005 |
| 2020/0193291 A1* | 6/2020 | Lee | G05B 23/024 |
| 2020/0193735 A1* | 6/2020 | Jung | G05B 23/0281 |
| 2020/0242400 A1* | 7/2020 | Perkins | G06V 10/776 |
| 2020/0393329 A1* | 12/2020 | Jung | G06N 3/045 |
| 2021/0150827 A1* | 5/2021 | Abramov | G06N 20/00 |
| 2021/0279644 A1* | 9/2021 | Givental | G06F 18/2321 |
| 2021/0374500 A1* | 12/2021 | Ghosh | G06N 20/20 |
| 2022/0327316 A1* | 10/2022 | Grauman | G06N 3/0464 |

FOREIGN PATENT DOCUMENTS

| | | | | |
|---|---|---|---|---|
| KR | 10-2020-0075148 A | | 6/2020 | |
| WO | WO-2021195689 A1 * | | 10/2021 | G06F 18/217 |

\* cited by examiner

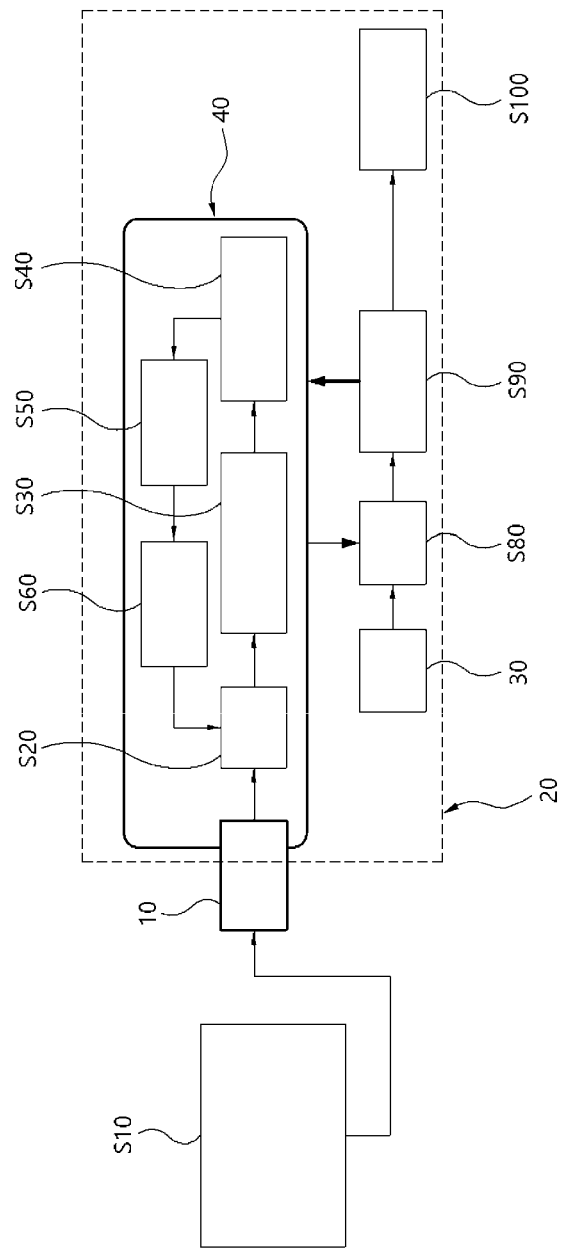

FIG.2

| Hyper-parameter | | |
|---|---|---|
| (Mini-) batch size | | |
| Max epoch (MAXIMUM NUMBER OF ITERATIONS) | | |
| Learning rate | | |
| Regularization parameter (Drop-out rate, L1 & L2 regularization ETC.) | | |
| Weight & Bias initialization VALUE | | |
| NUMBER OF LAYERS | | |
| NUMBER OF NODES | | |
| CNN | Number of filters | |
| | Filter size | |
| | Stride | |
| | Padding | |
| | Dilation rate | |
| POOLING SIZE WHEN VARIOUS POOLING TECHNIQUES ARE APPLIED (Ratio) | | |
| TYPES OF ACTIVATION FUNCTIONS | | |
| WEIGHT VALUE OF EACH MODEL WHEN ENSEMBLE MODEL IS CONFIGURED | | |

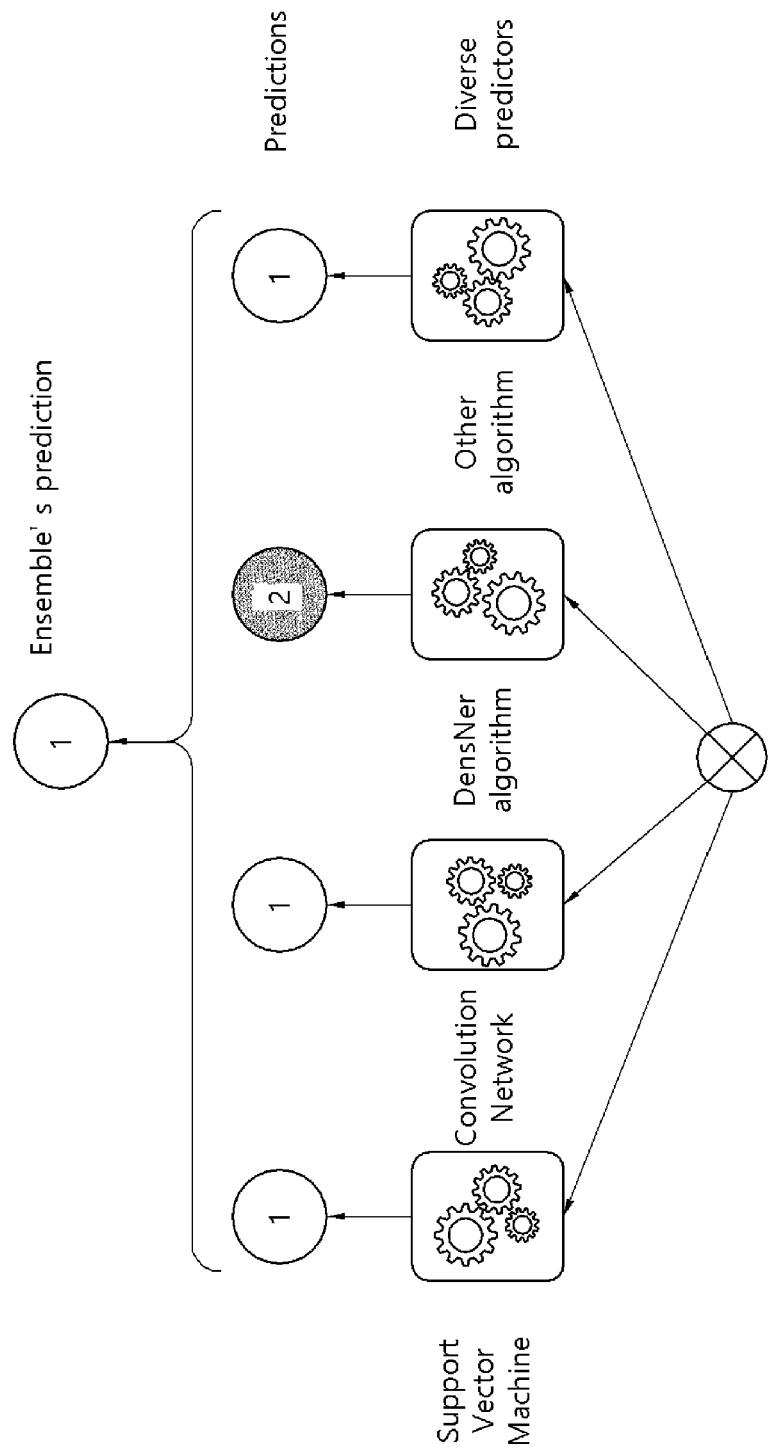

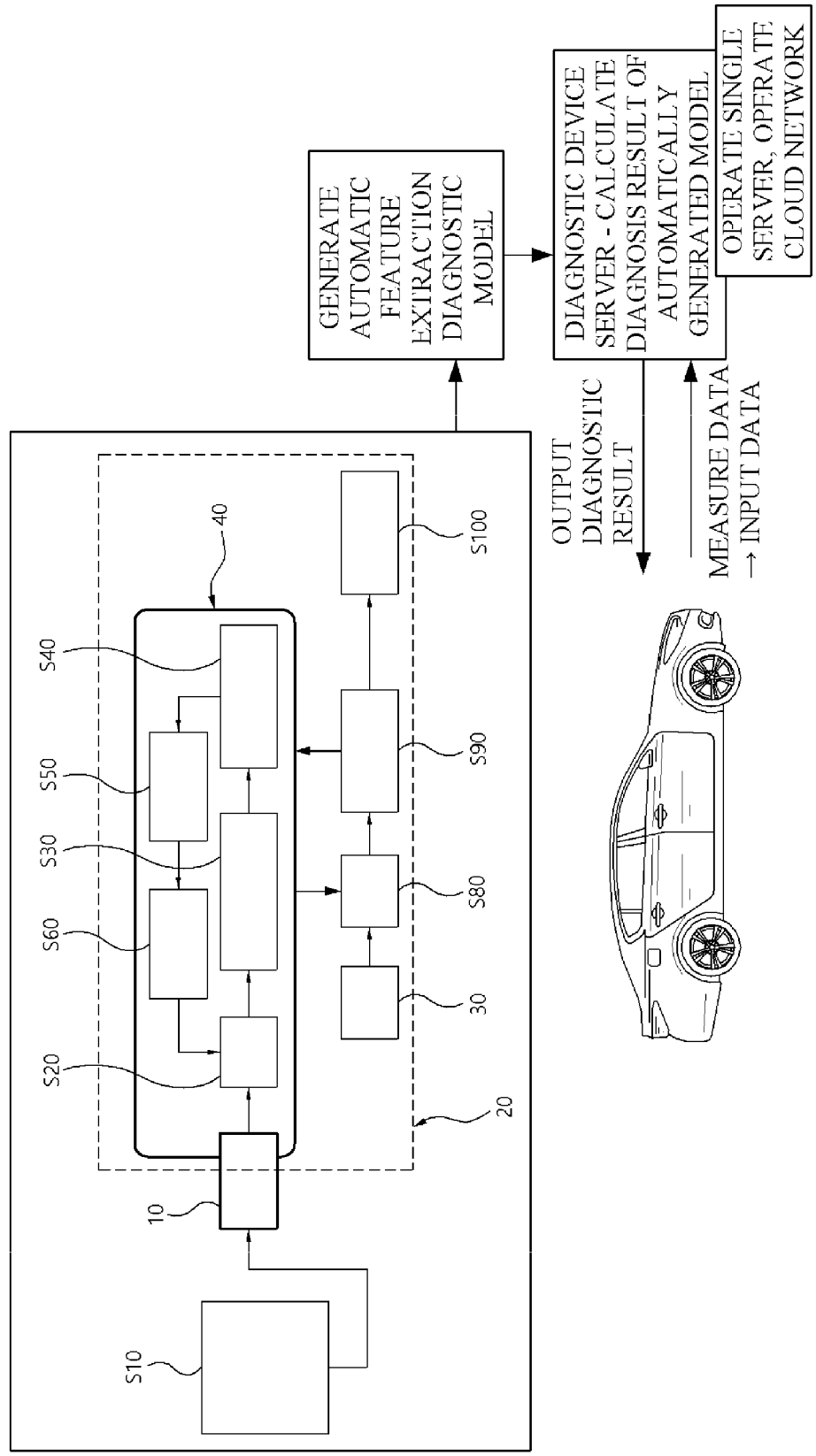

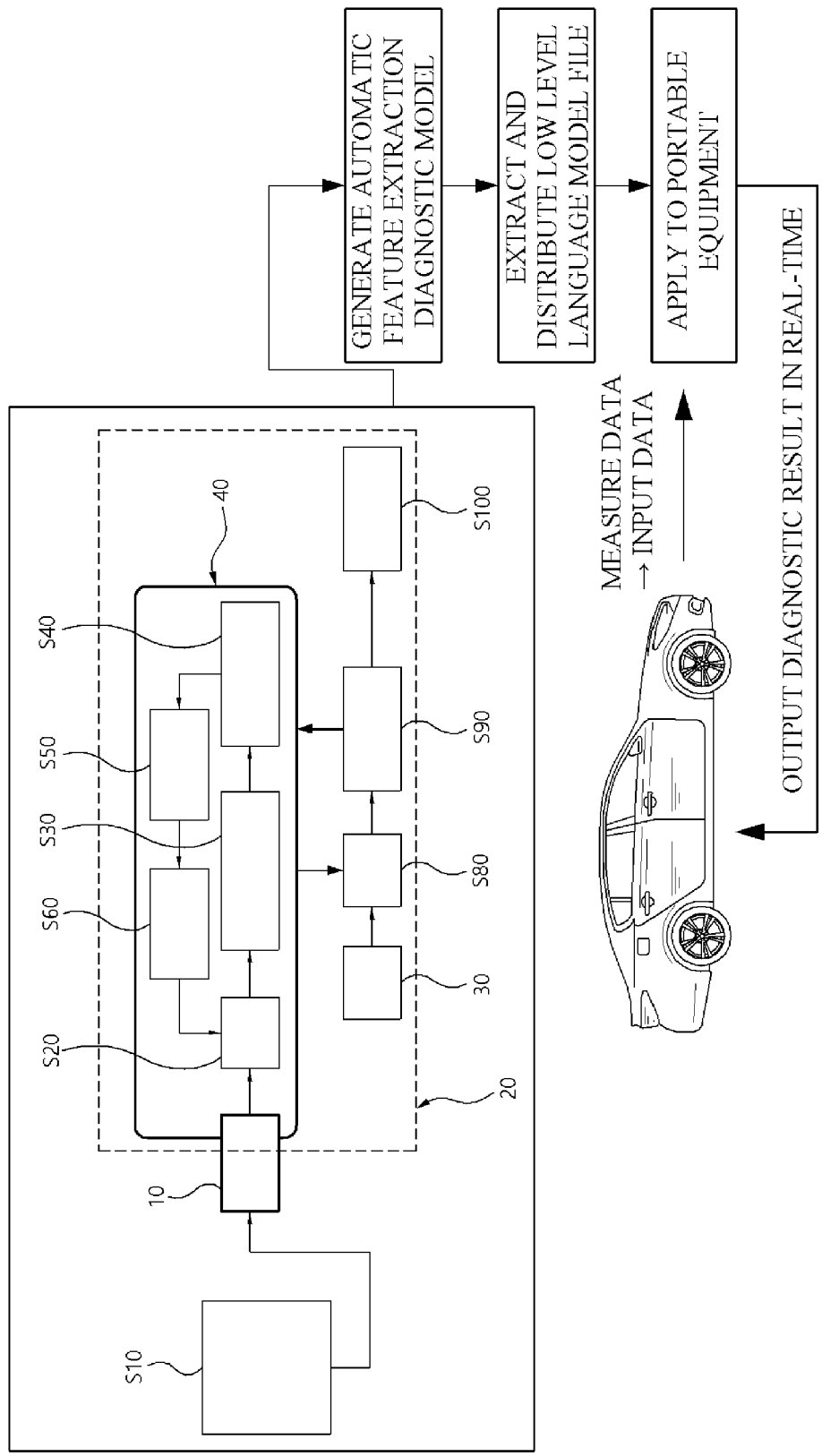

AUTOMATION METHOD OF AI-BASED DIAGNOSTIC TECHNOLOGY FOR EQUIPMENT APPLICATION

CROSS-REFERENCE(S) TO RELATED APPLICATIONS

This application claims the benefit of priority to Korean Patent Application No. 10-2021-0063610, filed on May 17, 2021 in the Korean Intellectual Property Office, the entire contents of which is incorporated herein by reference.

TECHNICAL FIELD

Exemplary embodiments of the present disclosure relate to an automation method of artificial intelligence (AI)-based diagnostic technology for searching an AI model architecture from a type of big data collected in a vehicle, that is, feature extraction of sensor measurement values of noise and vibration and a controller area network (CAN) signal, and more particularly, to an automation method of AI-based diagnostic technology for equipment application.

BACKGROUND

Automated machine learning (also referred to as an automated ML or an Auto ML) is a process for automating a time-consuming and repetitive task of developing a machine learning model. Since the existing machine learning model development uses a lot of resources, generating and comparing tens of machine learning models require significant domain knowledge and time. When the automated machine learning is used, it is possible to reduce a time for acquiring a machine learning model.

Recently, with the development of AI, technologies related to diagnosis and control using the automated machine learning in industries are rapidly developing. However, the current level of AI diagnosis and control technology is generating diagnostic models that depend on individual abilities based on the experience of personnel involved in artificial intelligence. That is, open analysis is being applied to extract the required features for big data collected from vehicles.

For diagnostic performance, since the open analysis method develops a diagnostic model while repeating a trial and error process, there is a problem in that a lot of times and efforts are required and it is difficult to determine whether the developed diagnostic model is the best performing model. Automation means the implement of automated machine learning or deep learning with the open Auto ML cloud-based platform service.

Recently, attempts have been made towards automated machine learning (also referred to as an automated ML or an Auto ML). The automated machine learning is a process for automating a time-consuming and repetitive task of developing a machine learning model. Since the existing machine learning model development uses a lot of resources, generating and comparing tens of machine learning models require significant domain knowledge and time. That is, in order to effectively get the most out of machine learning, a team of highly trained data scientists should be mobilized to intervene each operation and build, apply, and optimize a model.

When the automated machine learning is used, it is possible to reduce a time for acquiring a model. However, in order to apply the automated machine learning, there are barriers to enable the automated machine learning, such as collection and characterization of data, selection and application of an algorithm, and training and adjustment.

SUMMARY OF PRESENT DISCLOSURE

An exemplary embodiment of the present disclosure is directed to a general-purpose automation method of artificial intelligence (AI)-based diagnostic technology, which is available to anyone and is capable of automatically performing feature extraction of a type of big data collected in a vehicle, that is, sensor measurement values of noise and vibration and a controller area network (CAN) signal, automatically searching not only machine learning but also a deep learning architecture, and automatically generating a file which is applicable to equipment which is to be mounted.

Other objects and advantages of the present disclosure can be understood by the following description and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, there is provided an automation method of an artificial intelligence (AI)-based diagnostic technology for equipment application, which includes receiving one or more pieces of data inputted from among vibration data, noise data, and controller area network (CAN) data which are collected from a rotating body in a vehicle, a data input processing operation of trimming the input one or more pieces of data, an operation of extracting features from the trimmed one or more pieces of data, setting a setting value of a hyper-parameter with respect to the one or more pieces of data among the vibration data, the noise data, and the CAN data, and generating a total of N models to include both of machine learning (ML) and deep learning (DL) as N individual models and generating ensemble prediction model structures with respect to the N individual models. As a parameter updating is being proceeded due to the hyper-parameter so as to minimize values of cost functions of the N individual models, a reward with respect to model accuracy performance is optimized and the ensemble prediction model structures of the N individual models change.

In addition, in the data input processing operation, the input data may be trimmed according to a problem frequency band and a data time length.

In addition, the trimmed data may be classified into a training dataset, a validation dataset, and a test dataset.

In addition, in the operation of extracting the features from the trimmed data, one algorithm or two or more algorithms for extraction of independent features may be used according to a classification performance determination index, and an ensemble prediction model may be selectively additionally applied.

BRIEF DESCRIPTION OF THE DRAWINGS

FIG. 1 is a block diagram illustrating an overall configuration of the present disclosure.

FIG. 2 is a diagram illustrating an example of a hyper-parameter.

FIG. 3 is a diagram illustrating an individual artificial intelligence (AI) model to which an ensemble prediction model is applied.

FIG. 5 is a diagram illustrating an exemplary embodiment of storing a model, which is calculated through the present disclosure, in a server and using the model.

FIG. 6 is a diagram illustrating an exemplary embodiment of storing a model, which is calculated through the present disclosure, in portable equipment and using the model.

DESCRIPTION OF SPECIFIC EMBODIMENTS

Figure 4:
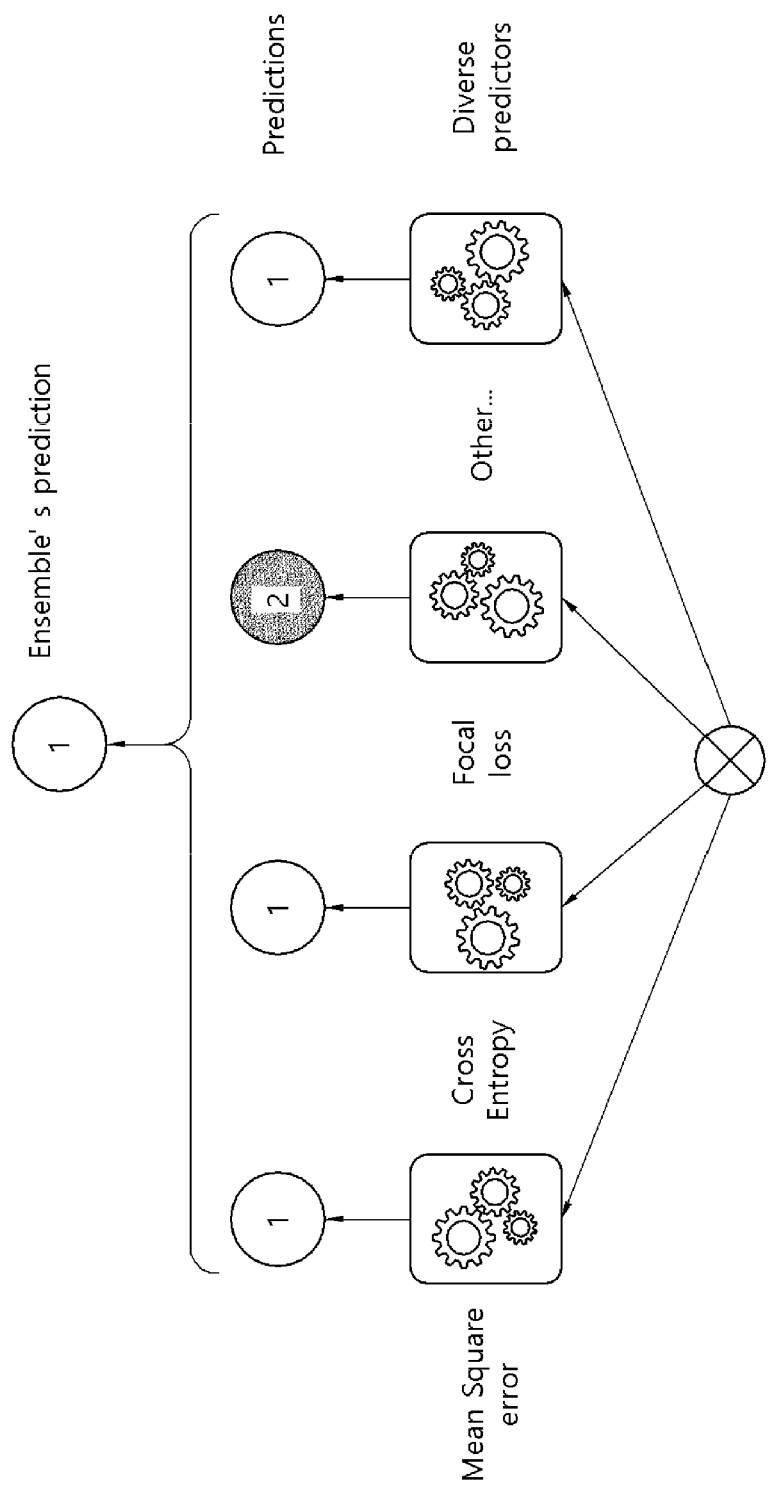
FIG. 4 is a diagram illustrating a cost function of the individual AI model to which the ensemble prediction model of FIG. 3 is applied.

Exemplary embodiments of the present disclosure will be described below in more detail with reference to the accompanying drawings, and these embodiments are examples of the present disclosure and may be embodied in various other different forms by those skilled in the art to which the present disclosure pertains so that the present disclosure is not limited to these embodiments.

The present disclosure is to extend and implement automated machine learning (Auto ML) to include deep learning (Auto ML/DL) and to realize automation through an optimization process.

The automation may be roughly divided into three types of automation according to a calculation operation.

A first type of automation is feature engineering automation for selecting and encoding important features from data so as to learn an artificial intelligence (AI) model. The feature engineering automation is a process of generating a function, which aids to improve a function of an ML algorithm, using domain information on data.

A second type of automation is automatically searching for a human setting, that is, a hyper-parameter, required for AI model learning.

There are various types of hyper-parameters required for deep learning model learning. The hyper-parameters are values, which may be set by a human, including, for example, a learning rate for determining how many units for updating parameters of a model are used, a mini-batch size which is a unit for how much data is divided to learn the data, a unit epoch for how many times to learn the data repeatedly, momentum, the number of convolution filters, and a stride. In many cases, deep learning frameworks (TensorFlow, PyTorch, and the like) basically provide a setting, which works well, as a default. However, when learning is not performed well even with a default setting, an experimental result is examined and then a hyper-parameter should be slightly tuned.

A third type of automation is architecture search automation which searches a structure of an AI model in a more efficient way. That is, the third type of automation is a method of searching a hyper-parameter and an optimal architecture. An architecture refers to a structure constituting a model, and even when a human does not think how to construct a model structure, it is possible to obtain an optimal structure through an automatic search. When the Auto ML is used, without the need for a human to think about each structure and tune hyper-parameters, a machine may decide the optimal environment in place of the human. Generally, when the Auto ML is used, it is possible to outperform a model devised by the human. This is because the machine may try a setting or a structure of combinations that the human has not thought of and the machine may not be bound to the existing setting conventions or restrictions.

Each operation constituting the present disclosure will be described with reference to FIG. 1.

According to an exemplary embodiment of the present disclosure, a controller (not shown) receives one or more pieces of data inputted from among vibration data, noise data, and controller area network (CAN) data which are collected from a rotating body in a vehicle. Here, the rotating body is a rotating body for power generation or power transmission and means an engine, a transmission, a motor, a reduction gear, or the like.

First, a data input processing operation (S10) is performed. In one embodiment of the present disclosure, only an act of designating and allocating a data storage space in advance is set by the human, and the other acts are automation operations according to a preset condition. It should be noted that, in this field, securing the data storage space in advance is only a simple human setting act such as login and logout and is not a main content of the present disclosure.

Data trimming is automatically performed even in a trimming condition. That is, it may be divided into the noise or vibration data and the CAN data, which may be added to each of the noise data and the vibration data, according to selection in a user interface area. The noise data, the vibration data, and the CAN data are acquired from a noise sensor, a vibration sensor, and CAN communication which are installed in the rotating body in the vehicle. In the data input processing operation (S10), data input processing for trimming input data is performed.

According to one exemplary embodiment of the present disclosure, diagnosis types of the data acquired through the sensors or the communication are classified according to their properties. For example, data indicating On/Off or True/False may become a simple diagnosis type having two patterns, or the diagnosis type may be larger than two diagnosis types. The diagnosis type of the data may be automatically determined according to a preset rule from the properties of the entire data, and the diagnosis type of the data is classified into binary classification and multiple classification according to the number of diagnosis types. When the number of diagnosis types is two, it is binary classification, and when the number of diagnosis types is three or more, it is multiple classification. The data may be organized such that the data is saved in a folder for each type, which is generated in advance.

A reproduction mode and a data time may be commonly defined in the noise data, the vibration data, and the CAN data. In addition, a problem frequency band may be defined with respect to the noise data and the vibration data. The reproduction mode defines a mode that is repeated or reproduced so as to minimize acquisition of repetitive data. The data time defines a data acquisition time as a criterion for collecting data when a problem type occurs. The reproduction mode or the data time, such as an engine speed and a vehicle speed, is defined so that a scale of data acquisition may be defined to be reduced. The problem frequency band defines a time width or a length of time in which the problem type occurs.

A data trimming condition performed in the data input processing operation (S10) is a problem frequency band and a length of a data time, and the data trimming is performed on the acquired data by reflecting the data trimming condition.

The data collected from the rotating body in the vehicle are classified into a training dataset, a validation dataset, and a test dataset for each diagnosis type according to the criterion set in a pre-processor, and a processor receives the training dataset, the validation dataset, and the test dataset to perform a calculation operation for automation. A position of the processor may be integrated with a sensor for dedicatedly acquiring a dataset for an automation system or may be separately placed in equipment located in equipment to which a generative model is applied.

The training dataset is a dataset for learning a model. Only the training dataset is used for learning the model.

The validation dataset is a dataset for validating the learned model.

The test dataset is a dataset for evaluating performance of the learned and validated model.

A concomitant feature of the validation dataset and the test dataset is that the model is not updated, that is, trained, through the datasets.

That is, the validation dataset updates, that is, does not train, the model but is involved in the learning. The test dataset is not involved in the learning at all and is used only to evaluate "final performance."

As described above, both the validation dataset and the test dataset evaluate the learned model and do not train the learned model.

According to one exemplary embodiment of the present disclosure, a trimming format of each of the noise data and the vibration data may be generated in two types of a wave file format and an American Standard Code for Information Interchange (ASCII) file format, and a trimming format of the CAN data may be generated in two types of an ASCII file format and a comma separated value (CSV) file format.

According to one exemplary embodiment of the present disclosure, the data input processing operation (S10) may be a semi-automation operation of classifying the data collected from the vehicle for each type and trimming the data. A difference between the automation operation and the semi-automation operation depends on whether the human is combined. Semi-Automation is performed in the processor due to combined human-machine activity which is coordinated by a computer controller. A semi-automated manufacturing process is coordinated by the computer controller which usually transmits a message at a point of time when an operation should be performed. The computer controller typically waits for feedback indicating that a human-performed operation is completed through a human-machine interface or an electronic sensor distributed in the process.

In a semi-automated process, the computer controller may directly control a machine or transmit a signal to a machine distributed in the process. The above process is referred to as the semi-automated manufacturing process in consideration of a part which is set or determined by the human.

Second, an automated machine learning and deep learning operation (S20) of automatically extracting and optimizing features from input data 10 is performed. That is, the automated machine learning and deep learning operation (S20) is an operation of extracting features from the trimmed data. Although it is difficult to classify data before the extraction of the features from the input data 10, it is easy to classify the data for each type after the extraction of the features from the input data 10. A signal processing algorithm applied for feature extraction may include a signal analysis technique used in AI diagnosis, and sound quality metrics which is a noise, vibration, and harshness (NVH) signal analysis technique expressing an auditory sense of the human may also be included in the AI diagnosis.

A signal analysis technique used in the AI diagnosis includes time analysis and frequency analysis. First, factors related to time analysis include Max, a root mean square (RMS), Varience, Skewness, Kurtosis, a Zero crossing rate, and the like.

In one embodiment, a signal analysis technique for extracting features through the frequency analysis includes Spectrogram, Mel filterbank, Harmonic Percussive separation, Spectral centroid, Spectral flatness, wavelets, and the like.

In one embodiment, in a signal analysis technique which includes an NVH signal analysis technique expressing human hearing in AI diagnosis and which extracts features, factors related to an algorithm relating to sound quality analysis are as follows. That is, loudness is an index indicating an intensity of a sound perceived by a human ear, sharpness is an index indicating sharpness of the sound, and fluctuate strength is an index indicating a subjective perception of slower amplitude modulation of the sound up to 20 Hz, tonality is a pitch in a sound spectrum obtained by comparing a total level of the sound with a level of each frequency component, impulsiveness is an impact strength of the sound, and modulation means transformation of the sound.

Data of about 20%, which is a predetermined fraction of the training dataset, is used and an algorithm applied for feature extraction is applied, thereby extracting features from the input data 10. When only a portion of the data is used, a calculation time and a space may be saved by as much as the remaining portion of the used data.

The above exemplified algorithm applied for feature extraction is applied to extract features from the input data 10, and reinforcement learning is applied to perform a reward on the basis of a classification performance determination index. The purpose of the reinforcement learning is to maximize the sum of the reward, that is, a cumulative reward, received in the process.

The reward is an evaluation of how well the process is performed. The classification performance determination index is also referred to as a classification performance evaluation index, and accuracy, a confusion matrix, precision, and a recall are frequently used as performance evaluation indexes.

Therefore, the rewarding on the basis of the classification performance evaluation index means evaluation of how well a calculation is performed from classification performance evaluation indexes such as accuracy, an error matrix, precision, and a recall.

To this end, feature performance to which only an independent algorithm for extracting one feature is applied is determined first. That is, it is possible to determine whether extraction of feature performance is performed well even using one independent feature extraction algorithm. Second, it is possible to determine whether the extraction of feature performance is performed well by combining two or more independent feature extraction algorithms. In this case, a weight value of 1:1 may be assigned to the two or more independent feature extraction algorithms. Third, the two or more independent feature extraction algorithms may be combined to extract feature performance and it is possible to determine whether the extraction of feature performance is performed well by applying ensemble prediction. In this case, the sum of weight values with respect to the combination of the two or more independent feature extraction algorithms becomes 1.0. The ensemble prediction means ensemble learning which is a learning scheme for deriving more accurate prediction by using multiple algorithms and combining predictions in AI.

A feature extraction scheme, which exhibits the highest performance on the basis of the reward, is determined, and the input data 10 is automatically saved in a folder for each type by applying a scheme which extracts fixed features from all of the training dataset, the test dataset, and the validation dataset.

Third, an operation of optimizing the hyper-parameter (S30) is performed.

The operation of optimizing the hyper-parameter (S30) is an operation of automating a setting of the hyper-parameter among the performance factors of the diagnostic model. The hyper-parameter is a factor required for model construction and is exemplified in FIG. 2 as a parameter which affects performance. The operation of optimizing the hyper-parameter (S30) sets a setting value of a hyper-parameter with respect to one or more pieces of data among the vibration data, the noise data, and the CAN data.

Examples of the hyper-parameter include a batch size, a maximum epoch (the maximum number of literation), a learning rate, regularization parameters (a drop out rate, L1 & L2 regularization, and the like), weight & bias initialization values, the number of layers, the number of nodes, the number of filters as factors of the DL/ML models, a filter size, a stride, padding, a dilation rate, a pooling rate (ratio) when various pooling techniques are applied, a type of an activation function, and a weight value of each ensemble model while an ensemble model is configured.

When data for each classification type generated in the data input processing operation (S10) is received, the input data 10 may be automatically processed. A process for the above description determines whether the input data 10 is the vibration data or the noise data first. In this case, whether the input data 10 is the CAN data may be additionally determined (step 1). Then, an appropriate hyper-parameter setting value is applied to a type of the vibration data or the noise data (additionally the CAN data) (step 2). Thereafter, the hyper-parameter is updated while model optimization is iteratively performed (step 3). A final model parameter update is automatically performed through the model to which the final hyper-parameter value is applied (step 4). After that, accuracy of the final model is extracted through the validation dataset of the model (step 5). Finally, the model is verified through the test dataset (step 6).

In an operation of preparing the Auto ML after the data preprocessing, when a frequency filtering technique and a signal processing technique are applied and in an operation of visualizing the preprocessed data (a basic analysis plot), the hyper-parameter is automatically determined for each task (automated setting hyper parameters). That is, for binary classification or multiple classification with respect to the noise data, the vibration data, and additionally the CAN data, a batch size, a learning rate, and a drop out of the hyper-parameter are automatically determined through the above steps 1 to 6.

Fourth, an automated machine learning and deep learning operation of searching the model (S40) is performed.

First, a case in which a structure of the model consists of only an individual model. As an example of the individual model, a performance evaluation result for an individual deep learning/machine learning models among various prediction values of a support vector machine (SVM), a convolution network, a DensNet algorithm, and other algorithms and a diagnostic result of the individual model may be different from each other, even with respect to the same input value, as True or False such as in the example (only the DensNet algorithm is False). That is, there is a high probability in that the individual model exhibits the diagnosis result as True or False with respect to the same input.

In order to overcome the above problem, it is necessary to apply an ensemble scheme. FIG. 3 shows an example in which the SVM, the convolution network, and other algorithms are True denoted as "1" and the DensNet algorithm is False denoted as "2," and when ensemble prediction is applied, the overall results become True of "1." That is, the performance of the individual models is deduced and combined and the weight values are assigned so that one integrated model may be obtained and the performance may be improved. The DensNet algorithm functions in the overall models but assigns a low weight value. The reason is that there is a possibility in that the accuracy of diagnosis for a specific condition is increased.

The SVM, which is proposed as an example, is one among techniques for searching a group classification rule with respect to a given sample group. A convolution neural network (CNN) is one type network of multi-layer feed-forward artificial neural networks used to analyze a visual image. The SVM is a machine learning algorithm, and the CNN and the DensNet algorithm are deep learning algorithms.

In particular, the CNN is classified as a deep neural network in the deep learning, and the DensNet algorithm, which is mainly applied to visual image analysis, means a dense convolution network. That is, both of the ML algorithm and the DL algorithm are included in N individual functions.

In the automated machine learning and deep learning operation of searching the model (S40), a total of N models are generated to include both of the machine learning and the deep learning as N individual models, and ensemble prediction model structures are generated with respect to the N individual models. Here, N may represent a natural number.

Fifth, model structure optimization operations (S30 and S40) are performed.

The model structure optimization operations (S30 and S40) are operations of generating a deep learning architecture after setting hyper-parameters and are operations of generating automatic model structures of the deep learning and the machine learning. In the process of determining the optimal hyper-parameter through tuning from the operation of optimizing the hyper-parameter (S30), it is possible to determine an optimal model parameter through training of the model, that is, through the training dataset. Consequently, a weight parameter and a bias parameter are updated for each layer.

The parameter updating proceeds such that a cost function of the model is minimized from the calculation result in the model. That is, as a result of model learning through forward and backward calculations, an optimized model is established with a value which is set in the automation system and parameters are automatically updated due to the hyper-parameters so that the model structure is changed.

Optimization of the hyper-parameters is performed by an automation algorithm such as grid search, random search, or random Latin hypercube.

When the hyper-parameters are optimized, it is very helpful in improving model performance. Grid search receives a plurality of hyper-parameter values specified as a list and evaluates model performance with respect to all combinations, thereby searching a combination of the optimal hyper-parameters. The grid search (lattice search) is a search method of sequentially inputting values which may be put into model hyper-parameters and then searching hyper-parameters which exhibit the highest performance. The grid search literally corresponds to a method of making all cases into a table and searching all cases of the table, whereas random search randomly enters hyper-parameter values and then generates a model using hyper-parameters exhibiting excellent values. The random Latin hypercube is an algorithm for complementing the grid search and the random search.

According to the related art, the updating of the Auto ML model and the hyper-parameters is performed by inputting models and other setting values on the basis of developer's experience, but according to an exemplary embodiment of the present disclosure, when the automatic model structure is generated, the automatic model structure is automatically generated through an accuracy reward on the basis of the validation dataset.

Sixth, cost function optimization operations (S50 and S60) are performed. In FIG. 4, a mean square error (MSE), cross entropy, a focal loss, and parameters of various other diagnostic models are factors which affect the performance of the model, and all the parameters are updated in a direction in which a value of a cost (loss) function is minimized, that is, in a direction in which the loss function is optimized. That is, in the performance results of N cost functions, performance of an individual cost function is evaluated, and the result may be affected by True with a cost (loss) of "1," or by False with the cost (loss) of "2." Thus, when an ensemble cost function is applied to the performance of the individual cost function, a weight value is given to the result of the individual cost function so that it is possible to prevent an overfitting phenomenon, which may occur when one cost function is applied, and to configure a robust model.

The loss function represents an error with respect to a correct answer as a number and, as being close to an incorrect answer, the loss function yields a large value. In contrast, as being close to the correct answer, the loss function yields a small value. The most commonly used loss functions are an MSE, a cross entropy error (CEE), and a focal loss.

A performance improvement technique of the cost function is possible through individual performance verification of three representative cost functions. In order to generate an ensemble model comprised of the cost function, an automation algorithm may be applied. In this case, when performance of the inference model is significantly affected due to a first-order individual cost function, it is required to apply an ensemble algorithm to the cost function.

As the parameter updating is performed due to the hyper-parameter so as to minimize a value of the cost function of the N individual models, structures of the N individual models, which constitute the ensemble prediction model structure while a reward is optimized, are changed. Here, the reward means a reward for model accuracy performance. After the result of each of the N individual models is compared with the result of applying the ensemble model and then verification is performed on an accuracy output of the calculated model using the validation dataset, a setting of repeated individual models may be randomly selected, and a weight value in the ensemble prediction model may also be randomly selected.

In summary, the input data 10 is collected by applying input data measured in real-time through equipment and pre-stored separate data (S10), a signal of the data input 10 from a data input unit is analyzed to extract features (S20), hyper-parameters are set (S30), an AI is set (S30), a loss function is derived (S40), and the derived loss function is minimized to optimize an AI DL/ML structure (S50). A circulation block of a reference numeral 40 refers to a circulation block 40 that is automatically optimized while the above process in which the AI DL/ML model is optimized is repeatedly circulated.

Further, in the circulation block 40, the models generated by the training dataset and the validation dataset are trained and verified, and accuracy of the diagnostic model, which is complicated in training and verification in the circulation block 40 (S80), is diagnosed using a test dataset 30 classified in the pre-processor (S90). If the diagnostic model is determined to be correct as the diagnosis results, a file capable of executing a diagnosis technique may be generated (S100). The entire process from the input data to the file generation is referred to as a diagnostic model generation block 20.

Referring to FIG. 5, the diagnostic model of which the features are automatically extracted in the diagnostic model generation block 20 is installed in a diagnostic device, that is, diagnostic equipment, and a diagnostic result may be output using input data collected from data measured in an actual vehicle. In this case, the diagnostic model of which the features are automatically extracted in the diagnostic model generation block 20 may be transmitted to a diagnostic device server which is prepared for the diagnostic device. The input data collected from the data measured from the actual vehicle is transmitted to the diagnostic device server so that the diagnostic result may be received from the diagnostic device server to be outputted.

Referring to FIG. 6, the diagnostic model of which the features are automatically extracted in the diagnostic model generation block 20 is converted into a low level language file, and the low level language file is extracted/distributed and mounted on portable equipment. It is also possible to directly output the diagnosis result in real time using the portable equipment without transmitting the input data collected from the data measured in the actual vehicle to the diagnostic device server.

In other words, another objective of the present disclosure is to automatically generate an expert-level model result by configuring the diagnosis result using basic software on the basis of a low-level languages (C, C++, or JAVA) and standardizing an input/output of the diagnosis result. That is, it is possible to automatically set features suitable for a type of pre-processed data and to generate products of which a deep learning architecture is automatically designed. The reason why a configuration of the basic software on the basis of the low-level language is necessary is to configure the standardized data input/output format to perform compiling in the form of an applicable format and to allow generation of a portable application file (APK).

As an exemplary embodiment to which the above description is applied, the automation method of AI-based diagnostic technology for equipment application, which is the present disclosure, is operated in equipment of a development part and may be applied in a server or cloud scheme.

As another exemplary embodiment, automatic implementation of the model optimization is the same, but the automation method is converted using the low-level language so as to be directly applied to portable equipment instead of a high-performance server. A complicated DL/ML model is converted into the low-level language, information succession with respect to the input signal and the output signal with respect to the model result are defined, and an AI diagnostic model library in the form of being operable in Android and ISO environments, which are operating systems of the portable equipment, may be generated, distributed, and applied.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

What is claimed is:

1. An automation method of an artificial intelligence (AI)-based diagnostic technology for equipment application, the automation method comprising:
   receiving one or more pieces of data inputted from among vibration data, noise data, and controller area network (CAN) data, which are collected from a rotating body in a vehicle;
   a data input processing operation of trimming the input one or more pieces of data;
   an operation of extracting features from the trimmed one or more pieces of data;
   setting a setting value of a hyper-parameter with respect to the input one or more pieces of data among the vibration data, the noise data, and the CAN data; and
   generating a total of N models to include both of machine learning (ML) and deep learning (DL) as N individual models and generating ensemble prediction model structures with respect to the N individual models,
   wherein, as a parameter updating is being proceeded due to the hyper-parameter so as to minimize values of cost functions of the N individual models, a reward with respect to model accuracy performance is optimized and the ensemble prediction model structures of the N individual models change.

2. The automation method of claim 1, wherein, in the data input processing operation, the input one or more pieces of data is trimmed according to a problem frequency band and a data time length.

3. The automation method of claim 2, wherein the trimmed one or more pieces of data is classified into a training dataset, a validation dataset, and a test dataset.

4. The automation method of claim 3, wherein, in the operation of extracting, one algorithm or two or more algorithms for extraction of independent features are used according to a classification performance determination index, and an ensemble prediction model is selectively additionally applied.

5. The automation method of claim 4, wherein:
   when the two or more algorithms for extraction of the independent features are used, each of the two or more algorithms for extraction of the independent features has a weight value of 1:1; and
   when the ensemble prediction model is selectively additionally applied, a sum of the weight values is one.

6. The automation method of claim 1, wherein:
   optimizing the hyper-parameter is performed by a grid search, a random search, or a random Latin hypercube automation algorithm; and
   as the hyper-parameter is updated, an Auto ML/DL model structure is optimized.

7. The automation method of claim 6, wherein, when the Auto ML/DL model structure, to which a final hyper-parameter is applied, is optimized, model verification is performed using a validation dataset, and evaluation of a final model is performed using a test dataset.

8. The automation method of claim 7, wherein cost functions of the N individual models are confirmed, and then a robust model configuration is obtained by applying the cost functions of the N individual models to the ensemble prediction model structures, respectively.

9. The automation method of claim 8, wherein a weight value is assigned to an individual cost function constituting a corresponding one of the cost functions applied to the ensemble prediction model structures.

10. The automation method of claim 1, wherein the rotating body is a rotating body for power generation or power transmission.

11. An equipment to which the automation method of an artificial intelligence (AI)-based diagnostic technology for equipment application according to claim 1 is applied.

* * * * *